United States Patent [19]

Whitt

[11] 3,907,690

[45] Sept. 23, 1975

[54] LUBRICANT COMPOSITION
[75] Inventor: James A. Whitt, Fort Wayne, Ind.
[73] Assignee: General Electric Company, Fort Wayne, Ind.
[22] Filed: Oct. 18, 1973
[21] Appl. No.: 407,636

Related U.S. Application Data

[63] Continuation-in-part of Ser. No. 292,550, Sept. 27, 1972, abandoned, and a continuation-in-part of Ser. No. 292,664, Sept. 27, 1972, abandoned.

[52] U.S. Cl. .................. 252/14; 5/361 B; 210/40; 210/DIG. 21; 252/13; 260/2.5 AL; 260/2.5 AD
[51] Int. Cl. ..... C10m 5/20; C10m 5/02; C10m 7/30
[58] Field of Search .......... 252/13, 14; 260/2.5 AL, 260/2.5 AD; 5/361 B; 210/40, DIG. 21

[56] References Cited
UNITED STATES PATENTS

| 2,427,636 | 9/1947 | Vaughan et al. | 252/13 |
| 2,900,338 | 8/1959 | Postelnek | 252/13 |
| 3,113,105 | 12/1963 | Slayter et al. | 252/13 |
| 3,657,125 | 4/1972 | Strickman | 210/DIG. 21 |
| 3,812,031 | 5/1974 | McCoy | 210/40 |

Primary Examiner—Delbert E. Gantz
Assistant Examiner—I. Vaughn
Attorney, Agent, or Firm—Joseph E. Papin

[57] ABSTRACT

A lubricant composition comprising a mixture of a major amount by weight of a liquid lubricant, a minor amount by weight of particulate mass of discrete, non-fibrous, multi-digited, resilient foam particles, and a minor amount by weight of synthetic fibers. A method of forming the lubricant composition and a lubricating system utilizing the lubricant composition is also disclosed.

34 Claims, 11 Drawing Figures

LUBRICANT COMPOSITION

CROSS-REFERENCE TO RELATED APPLICATIONS

This application is a continuation-in-part of my copending applications Ser. Nos. 292,550 and 292,664 each filed Sept. 27, 1972 now abandoned, and these copending applications, as well as my copending application Ser. No. 407,635 filed Oct. 18, 1973, are specifically incorporated by reference herein.

FIELD OF THE INVENTION

This invention relates generally to lubricant compositions and in particular to those utilizing a particulate polymer foam and synthetic fibers as a wicking material, the method of forming the lubricant composition, and a lubrication system utilizing the lubricant compositions.

BACKGROUND OF THE INVENTION

In the past, various lubricant compositions, which included wicking materials, were well known in the art and commercially available for use in lubricating various apparatus, such as electric motors for instance. The past known commercially available wicking type lubricants were composed of various fibrous materials, such as cellulose and synthetic fibers, including wood fibers, cotton fibers, nylon fibers, rayon fibers, glass fibers and the like. One form of lubricant composition, such as an oil impregnated, fibrous wicking material, is commercially available under the trademark PERMAWICK from the Permawick Company of Detroit, Mich. U.S. Pat. No. 2,966,459, issued Dec. 27, 1960, to M. L. Abel for "Material Having Oil Retaining Properties" describes a lubricant composition composed of cellulose fibers and a lubricating oil. The cellulose fibers which form the oil absorbing part of the wicking material are made from wood fibers and a mixture of paper containing fibers of wood, cotton and the like. U.S. Pat. No. 3,214,375, issued Oct. 26, 1965, to B. Berkeley for "Lubricating Wicking Material" discloses an oil impregnated fibrous wicking material in which the wicking material is a blend of cellulose and synthetic fibers, such as nylon or rayon fibers. The cellulose fibers are described as being coated at least in part with a coating material of polyvinyl alcohol. U.S. Pat. No. 3,466,244, issued Sept. 9, 1969, to M. L. Abel for "Oil-Impregnated Wicking Material" describes a lubricating oil impregnated wicking material formed of cotton linter fibers. Each of the above three patents is assigned to the Permawick Company, and these patents describe commercially available Permawick extrudable lubricating materials, the wicking material in each instance having a distinctly fibrous structure. While each of these patented lubricant compositions at least provided some advantages, one of the disadvantageous or undesirable features thereof was that they had the capacity to release only a relatively small or minor portion of the liquid lubricant contained therein.

U.S. Pat. No. 2,960,371, issued Nov. 15, 1960, to L. E. Staak for "Bearing Lubricating Structure" and U.S. Pat. No. 2,979,779, issued Apr. 18, 1961 to L. E. Staak for "Improved Method of Providing a Bearing Lubricating Structure" both describe an oil impregnated lubricating structure formed by foaming an epoxy or phenolic material in place directly in a bearing housing thereby to form a unitary cellular foam structure in the bearing housing. After the foam is formed in place in the bearing housing, the foam is impregnated with an appropriate lubricating oil.

The use of fibers of glass, asbestos, and the like as fillers for lubricating compounds is also known in the art. U.S. Pat. No. 2,303,068, issued Nov. 24, 1942, to G. H. Schoembaum for "Lubricant and Preparation Thereof" describes the use of asbestos fibers as a filler to form a viscous lubricating composition. U.S. Pat. No. 3,113,105, issued Dec. 3, 1963, to G. Slayter, et al., describes a silicone fluid lubricant incorporating short lengths of fibrous glass to form a lubricant composition for use at high temperatures.

Many bearing structures with which wicking type lubricants of the type known in the art have been used employ felt feeder wicks. See, for example, U.S. Pat. No. 3,434,765, issued Mar. 25, 1969, to M. L. Abel for "Lubricating Bearing Assembly and Method of Making Same," and U.S. Pat. No. 3,184,272, issued May 18, 1965, to A. J. Ridgway for "Lubricating Means for a Rotatable Device." In such constructions, it is desirable that the lubricant impregnated or charged wicking material release the lubricating oil which it contains at a rate and in an amount sufficient to maintain a steady flow of lubricant through the felt wick to the rotating structure to be lubricated. A significant problem confronting the art resides in the disadvantageous or undesirable feature that many of the lubricant compositions or extrudable lubricant impregnated wicking materials heretofore known, while capable of being extruded or otherwise packed into the bearing structure, were capable of releasing only a relatively small portion of the total amount of lubricating oil contained therein. The smaller the releasable proportion of oil, the shorter the life of the lubricant, and hence, of the bearing structure itself. Furthermore, the unreleased portion of the lubricant obviously was not available to perform the intended lubricating function.

SUMMARY OF THE INVENTION

Among the several objects of the present invention may be noted the provision of a lubricant composition, a method of making a lubricant composition, and a lubrication system utilizing such lubricant composition which overcome the aforementioned disadvantageous features of the prior art; the provision of a lubricant composition having a wicking material of synthetic fibers or quartz fibers and polymer foam particles with physical characteristics of being generally discrete, multi-digited, non-fibrous and resilient; the provision of a lubricant composition which exhibits improved and increased liquid lubricant release capacity; the provision of a lubricant composition which exhibits improved moisture resistance and is resistant to leaching of a liquid lubricant contained therein when subjected to a wet, moist or humid environment; the provision of a lubricant composition which has liquid lubricant release and transmission characteristics similar to that of conventional wool storage wicking material; the provision of a lubricant composition and a lubrication system which exhibit a long useful life in both dry and humid atmospheres with minimum re-oiling requirements; the provision of a lubricating system for a bearing assembly of apparatus in which a lubricant composition utilized as a storage wicking means has the capacity to release at least a major portion of the liquid lubricant contained therein to feeder wicking means for the bearing assembly; and the provision of a simplistic and economical method of forming a lubricant composition. Other objects and advantageous features of the present invention will be in part apparent and in part pointed out hereinafter.

In general, a lubricant composition in one form of this for lubricating a component which may be communicated therewith is a major amount by weight of a mixture of a minor amount by weight of a liquid lubricant, a particulate mass of synthetic fibers, and a minor amount by weight of a particulate mass of discrete, non-fibrous, multi-digited, resilient-type foam particles generally constituting means for both retaining and releasing the liquid lubricant adapted to effect the lubrication of the component. More particularly, the synthetic fibers are glass fibers having an average diameter of between about 1 and about 5.5 microns and an average length of between about 0.005 and about 0.015 inches, and the foam particles are a polyurethane polymer having a particulate size between about 5-mesh and about 200-mesh.

Also in general, a method in on form of the invention is provided for forming a lubricant composition adapted for releasing a liquid lubricant and lubricating a component which may be communicated therewith. In this forming method, a major amount by weight of the liquid lubricant and a minor amount by weight of a mass of synthetic fibers are mixed and admixed thereto is a minor amount by weight of a particulate mass of discrete, non-fibrous, multi-digited, resilient-type foam particles wherein the foam particles are generally saturated with the liquid lubricant thereby to form the lubricant composition. More particularly, the synthetic fibers are glass fibers having an average diameter of between about 1 and about 5.5 microns and an average length of between about 0.005 and about 0.015 inches, and the foam particles are reduced from a polyurethane foam material by fracturing the cell ribs and cell walls of the cellular structure thereof to a particulate size of between about 5-mesh to about 200-mesh. The lubricant composition thus formed may be packed by hand or by the use of commercially available extruding equipment into a bearing cavity of apparatus to be lubricated.

In addition and also in general, a lubrication system in one form of the invention for a bearing assembly having a rotatable shaft journaled therein and disposed in a lubricant cavity comprises a lubricant storage wicking means in the cavity, and a lubricant feeder wicking means disposed in interfacing and lubricating transferring relation between the lubricant storage wicking means and the rotatable shaft. The lubricant storage wicking means includes a particulate mass of discrete, non-fibrous, multi-digited, resilient foam particles and a particulate mass of synthetic fibers impregnated with a liquid lubricant and having the capacity to release at least a major portion of the liquid lubricant to the feeder wicker means. More particularly, the major portion is in a range of between approximately 53 to approximately 85%.

Also in general, another method in one form of the invention for forming a lubricant composition mixes a liquid lubricant and a particulate mass of quartz fibers, and admixed thereto is a particulate mass of discrete, non-fibrous, multi-digited, resilient polymer foam particles. More particularly, the quartz fibers have an average diameter of between about 1 and about 5.5 microns and an average length of between about 0.005 and about 0.015 inches, and the foam particles are reduced from a polyurethane foam material by rupturing the cell ribs and cell walls of the cellular structure thereof to a particulate size of between about 5-mesh and about 200-mesh. The lubricant composition thus formed may be packed by hand or by commercially available extruding equipment into a bearing cavity of apparatus to be lubricated.

DESCRIPTION OF THE DRAWINGS

Corresponding reference characters indicate corresponding parts throughout the several views of the drawings.

The exemplifications set out herein illustrate the preferred embodiment of the invention in one form thereof and such exemplifications are not to be construed as limiting in any manner.

DESCRIPTION OF THE PREFERRED EMBODIMENT

Referring now to the drawings in general, a lubricant composition 1 in one form of the invention (FIG. 1) is provided with a mixture of a liquid lubricant, a particulate mass of synthetic fibers, and a particulate mass of discrete, non-fibrous, multi-digited, resilient foam particles 5 (FIG. 1A), as discussed in detail hereinafter, and the lubricant composition finds particular, but not exclusive, utility for use in lubricating bearing means or the like for various apparatus. Foam particles 5, which generally constitute a polymeric wicking material, are described and claimed in my copending application Ser. No. 407,635 filed Oct. 18, 1973, and as previously noted, this copending application is specifically incorporated herein by reference. For a more detailed discussion of polymeric foam particles 5 per se, their use with a liquid lubricant as a lubricant composition, and the method of forming such lubricant composition, reference may be made to the aforementioned copending application.

In a lubrication system in one form of the invention, indicated generally at 9 (FIG. 1), a bearing means or assembly, such as a tin babbet metal sleeve bearing 10 or the like, is supported in a structural member, such as an end shield 11 or the like, of apparatus, such as a dynamoelectric machine or the like (not shown), and a rotatable member, such as a shaft 12, is rotatably supported in the end shield and journaled in the bearing means. End shield 11 together with an end cap 14 and an oil well cover 15 define a lubricant chamber or cavity 16 for receiving and retaining lubricant storage wicking means, such as lubricant composition 1. For transmitting the liquid lubricant or oil from lubricant composition 1 to bearing 10 and shaft 12, a feeder wicking means, such as a wool felt wick 19 or the like well known to the art, is conventionally disposed in interfacing and lubricant transmitting or transferring relation between the lubricant composition and the peripheral or journaled surface of rotatable shaft 12 extending through an opening or window 20 in bearing 10, and return means, such as an oil thrower or slinger 21, is mounted on shaft 12 in a manner well known in the art for returning or slinging oil, which flows from the feeder wicking means between the bearing and shaft back into storage in lubricant composition 1. While there may be some applications where lubricant composition 1 might be utilized in direct lubricant transferring relation or engagement with shaft 12, the preferred application is to utilize the liquid composition in interfacing and lubricant transferring relation with feeder wicking means 19, as described above. Further, the construction of lubrication system 9 is illustrative only, and it, as well as lubrication composition 1, is not intended to be limited to the particular sleeve bearing 10 shown. See also, for example, the bearing structures shown in U.S. Pat. Nos. 2,966,459, 3,434,765, 3,184,272 and 2,960,371 referred to above.

A method in one form of the invention for forming lubricant composition 1 generally comprises initially mixing liquid lubricant 3 with the particulate mass of synthetic fibers and then admixing thereto the particulate mass of discrete, non-fibrous, multi-digited, resilient foam particles 5. Although the particular order of mixing stated above is preferred, it is contemplated that other orders of mixing liquid lubricant 3, the synthetic fibers and foam particles 5 may also afford the desired results for forming lubricant composition 1. Further, it is conventional practice in the art to select a liquid lubricant or lubricating oil in accordance with the characteristics of the bearing means to be lubricated with reference to the particular configuration and bearing material thereof and in accordance with the conditions under which the apparatus housing such bearing means will be operated keeping in mind the particular environment to which such apparatus will be exposed.

More particularly, the wicking material utilized in accordance with one form of the invention is embodied in the form of glass fibers which, having extremely small diameters, are sometimes referred to as "microfibers" or as "microfiberglass". The microfibers of glass have, in general, an average fiber diameter of between about 0.75 and about 5.5 microns (about 0.00003–0.00022 inches), and the fibers are formed of an appropriate glass, such as borosilicate glass, or of quartz (silicon dioxide). One form of microfibers of glass, known as 108 type E is obtainable from the Johns-Manville Co. and consists of very fine fibers of borosilicate glass having an average fiber diameter of 0.76 to 1.5 microns, and another type, also obtainable from Johns-Manville Co., is 110 type 475 consisting of fine fibers of borosilicate glass having an average diameter of 1.52 to 2.54 microns. Because microfibers of glass are conventionally supplied in a form in which the glass is in long strands or hairs, the material is preferably reduced in length, by chopping or comminuting or the like, prior to use to an average length in the range of about 125 to about 380 microns (0.005 to 0.015 inches). While microfibers of glass and microfibers of quartz, as discussed hereinafter, are disclosed as the synthetic fibers of lubricant composition 1, it is believed that other synthetic microfibers having average diameters within the range mentioned above, i.e., between approximately 0.75 and 5.5 microns, may also work in the lubricant composition.

The polymeric foam particles 5 are formed, as more particularly described in my copending application Ser. No. 407,635, filed Oct. 18, 1975, by first producing a polymer foam material, such as polyurethane foam, having a resilient cellular structure. The foamed resilient polymer is then reduced, such as by comminuting or the like, to a particle size between about 5-mesh and about 200-mesh, and more particularly, to a particle size such that a major portion in the range of about 65 to about 85 per cent of the particles pass a 20-mesh screen and about 2 to about 10 per cent passes an 80-mesh screen. Polymeric foam particles 5 are produced by fracturing or rupturing the cellular structure, i.e., fracturing or rupturing both the cell ribs and the cell walls of the foamed polymer material, thereby to produce highly irregular, branched or multi-digited particles. Among the polymeric materials which have been found to be useful in connection with the present invention are the widely known resilient polyurethane foams, particularly polyurethane foams of the ether and ester types. These foams are well known in the art and are widely available from a variety of commercial sources under the general designation of "polyurethane" foam. The principal characteristic of the polymeric foam, such as a polyurethane foam from which foam particles 5 are formed, is that the foam be characterized as "resilient" as distinguished from "rigid" when in the block form. As used herein, these terms distinguish between those resilient foam materials which give or yield to touch and, when squeezed by hand, revert to substantially their original configuration, and the relatively rigid foam materials which crush or fracture when squeezed by hand and do not revert to their original configuration after squeezing. The desired resilient or spongy foam materials retain their characteristics resilient feel after comminution or granulation, whereas the rigid foam materials retain a brittle, non-resilient characteristic after comminution or granulation.

The liquid lubricant or lubricating oil may be of any selected type, depending principally upon the use, operating conditions and atmospheric conditions in which the lubricant is to be utilized. For example, for many fractional horse power motor applications, a lubricant such as is designated in U.S. Pat. No. 3,466,244 as a 280 oil may be utilized. The oil selected is mixed with the microfibers of glass, and the particulate polymeric material, such as foam particles 5 produced by comminuting the polyurethane foam material, is admixed thereto. Generally speaking, the ratio of foam particles 5 to fiberglass in lubricant composition 1 would be between about 3 to 1 to about 5 to 1 weight. Lubricant composition 1 is substantially saturated with the liquid lubricant with the glass fibers and foam particles 5 forming between about 10 and about 20 per cent by weight and the liquid lubricant forming between about 80 and about 90 per cent by weight of the lubricant composition. More specifically, the wicking material, i.e., the microfibers of glass, and polymer foam particles 5, forms about 13 to about 17 per cent by weight of the lubricant composition and the lubricant oil itself forms about 83 to about 87 per cent by weight of lubricant composition 1. Lubricant composition 1 is then packed either by hand or by commercially available extruding equipment, as well known in the art, into a bearing cavity, such as in an end shield, to feed the liquid lubricant either directly or through a felt wick to lubricate a shaft and sleeve bearing or other bearing structure, as previously described.

The following examples more particularly illustrate one form of the present invention as embodied in the novel lubricant compositions. It should be understood that the examples are given by way of illustration and not by way of limitation:

EXAMPLE 1

Composition:
  10% by weight of microfibers of glass having an average fiber diameter within the range of 1.52 to 2.54 microns
  90% by weight type 280 bearing lubricating oil
Preparation:
  The microfibers of glass in bulk were obtained from the Johns-Manville Company of New York City, as its fiber diameter size number 110, (fiber 110 Type 475) constituting an electrical insulation grade glass fiber, industry code AA. The fibers were chopped to a length of 0.005 to 0.015 inches and were thoroughly mixed with the bearing lubricating oil

EXAMPLE 2

Composition:
  10% by weight of microfibers of quartz having an average fiber diameter within the range of 0.76 to 1.52 microns
  90% by weight type 280 bearing lubricating oil.
Preparation:
  The microfibers of quartz in bulk form were obtained from the Johns-Manville Company, as its fiber diameter size number 108, constituting an electrical insulation grade quartz fiber, industry code AA. The fibers were chopped to a length of 0.005 to 0.015 inches and then thoroughly mixed with the bearing lubricating oil.

EXAMPLE 3

Composition:
  5% by weight of microfibers of glass having an average fiber diameter within the range of 0.76 to 1.52 microns
  5% by weight of microfibers of glass having an average fiber diameter within the range of 1.52 to 2.54 microns
  90% by weight type 280 bearing lubricating oil
Preparation:
  Bearing lubricating oil was poured into a container housing equal parts by weight of Johns-Manville microfibers of glass of diameter sizes 108 and 110 (fibers 108 Type E and 110 Type 475) chopped into short lengths as described above. The oil impregnated glass microfibers were then thoroughly mixed until a substantially homogeneous blend of the oil and fibers was obtained.

EXAMPLE 4

Composition:
  10% by weight of microfibers of glass having an average fiber diameter within the range of 0.76 to 1.52 microns
  90% by weight type 280 bearing lubricating oil
Preparation:
  The microfibers of glass in bulk form were obtained from the Johns-Manville Company, as its fiber diameter size number 108 (fiber 108 Type E). The fibers were chopped to an average length of 0.005 to 0.015 inches, and thoroughly mixed with the bearing lubricating oil.

EXAMPLE 5

Composition:
  5% by weight of microfibers of glass having an average fiber diameter within the range of 0.76 to 1.52 microns
  95% by weight type 280 bearing lubricating oil
Preparation:
  The microfibers of glass in bulk form were obtained from the Johns-Manville Company, as its fiber diameter size number 108 (108 Type E). The fibers were chopped and thoroughly mixed with bearing lubricating oil as described in Example 4. The weight ratio of 95% oil to 5% glass fibers was observed to substantially saturate the glass fibers.

Figures 1, 2:
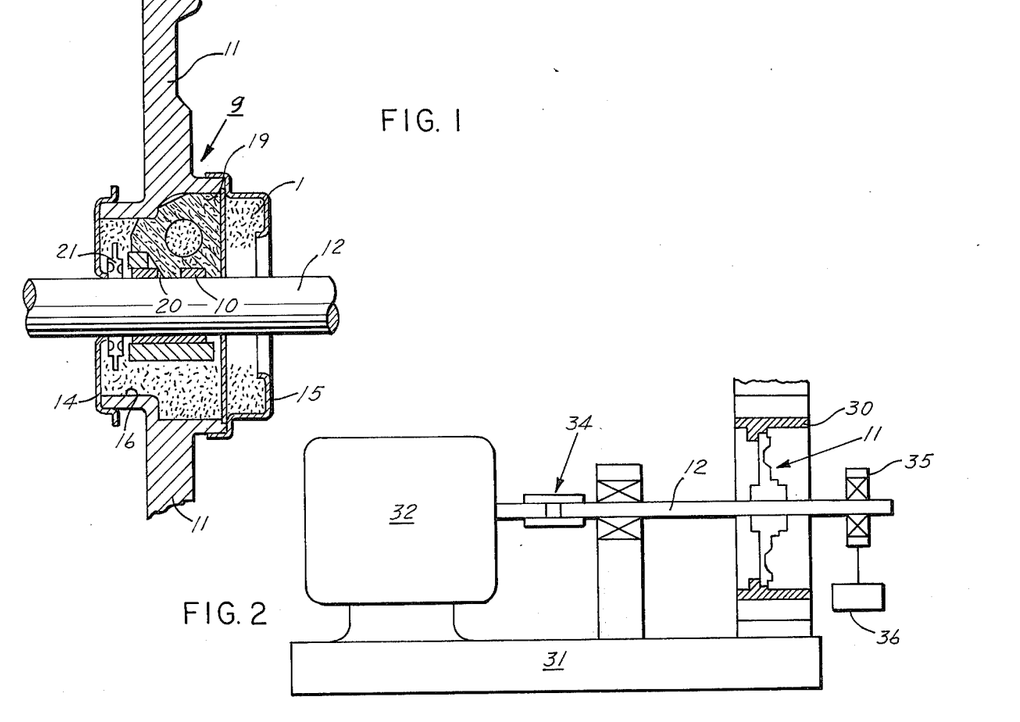
FIG. 1 is a sectional view of a bearing cavity illustrating a lubrication system of this invention utilizing a lubricant composition of the invention therein which may be formed in accordance to methods of this invention.
FIG. 2 is a diagrammatic representation of a reaction type dynamometer testing apparatus.
Figure 1A:
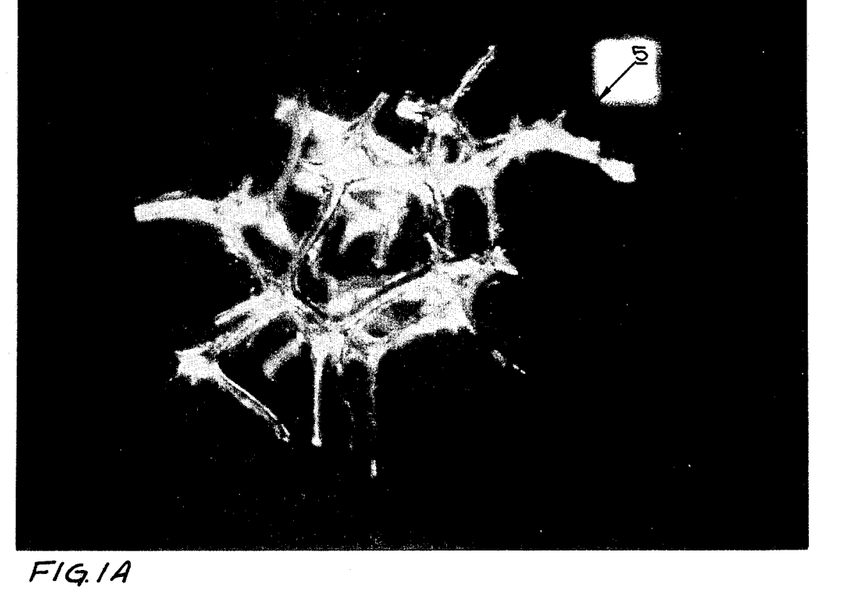
FIG. 1A is a photomicrograph, 40X magnification, of a polymer foam particle for use in the lubricant composition of this invention.
Figure 1B:
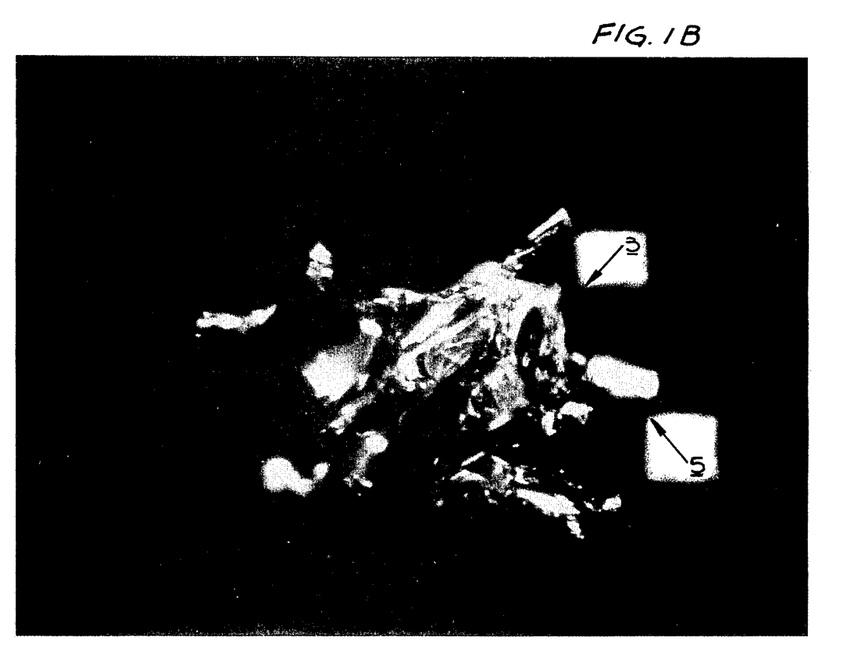
FIG. 1B is a photomicrograph of 40X magnification of a polymer foam particle similar to that shown in FIG. 1A mixed with a liquid lubricant for use in the lubricant composition of this invention.
Figure 4:
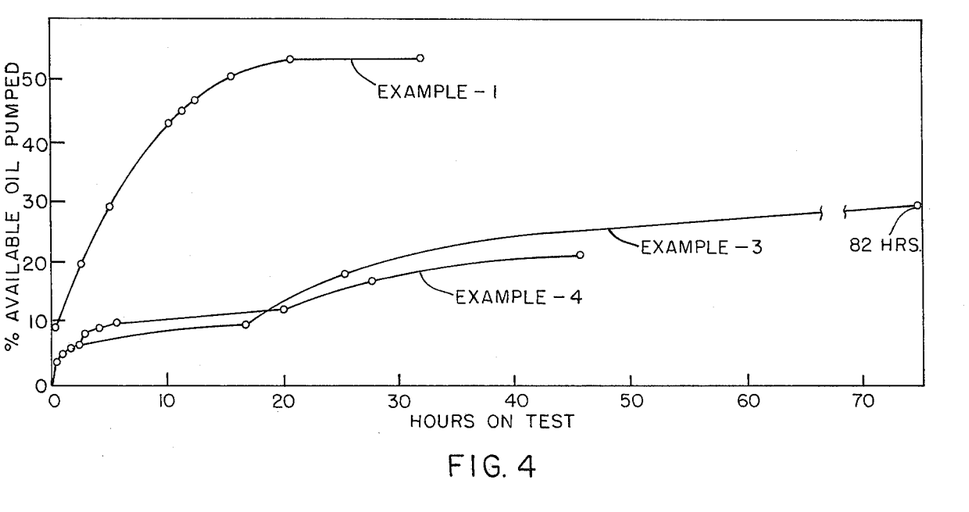
FIG. 4 is a graphic representation of the oil release characteristics of lubricant compositions prepared according to Examples 1, 3 and 4.

The lubricant impregnated wicking materials, prepared as described in Examples 1, 3 and 4, were then packed into a General Electric Company 39-Frame motor end shield, of the type shown in FIG. 1, but modified to prohibit oil from recirculating to the bearing cavity. Each end shield to be tested was mounted in a testing apparatus of the type shown in FIG. 2, and a bearing load of 45 pounds was applied to the shaft outboard of the bearing structure. The bearing temperature was maintained at 70° C. An on/off cycle of 4.75 minutes on and 0.25 minutes off was applied. The test results were plotted and are shown in solid lines in FIG. 4. With reference to FIG. 4, it may be seen that during the first few hours the oil impregnated wicking material of the invention released oil at an excellent rate, that is at a rate sufficiently high to ensure proper bearing lubrication, while not so high as either to cause overflow of oil within the motor, or to overstress the oil reabsorption rate capacity of the wicking material.

The test apparatus referred to is a dynamometer test apparatus and is illustrated diagrammatically in FIG. 2. In this apparatus, a General Electric 39-Frame motor end shield 11 of the type shown in FIG. 1 is mounted in a cradle bearing 30 supported on a base 31 and attached to a torque measuring transducer (not shown). The shaft 12 driven by a motor 32 is supported adjacent one end by the end frame and bearing 11 and by rear support bearings 34 intermediate the cradle bearing 30 and the drive motor 32. The shaft 12 extends through the test bearing 11 and supports at its outer end a load sustaining bearing 35 and weight 36. The bearing wick 19 as shown in FIG. 1 is positioned above the shaft 12 so that the weight 36, as shown in FIG. 2, is positioned 180° from the wick. The weight may, however, be positioned at any other angular relationship with respect to the wick, depending upon the particular test conditions.

Figure 3:
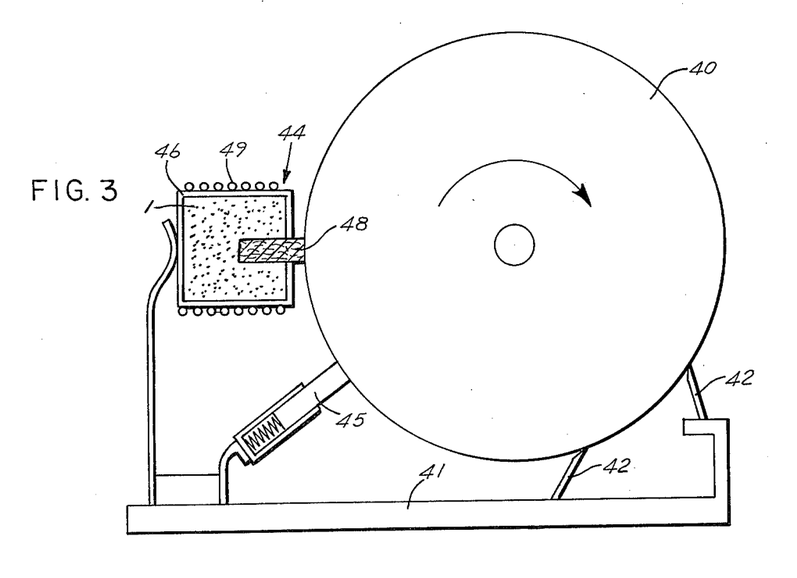
FIG. 3 is a diagrammatic representation of an oil release testing apparatus.
Figure 5:
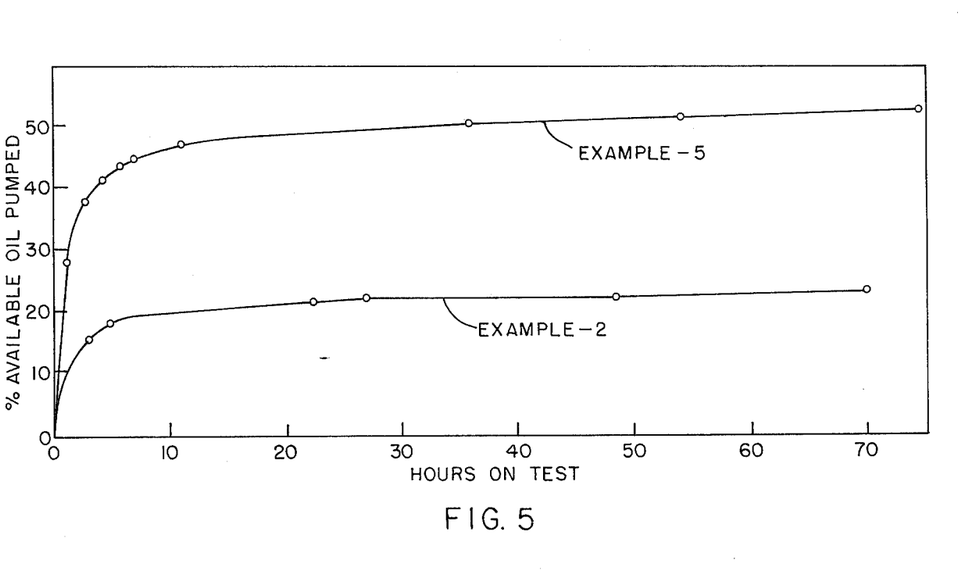
FIG. 5 is a graphic representation of the oil release characteristics of lubricant compositions prepared according to Examples 2 and 5.

The lubricating oil impregnated wicking materials prepared as described in Examples 2 and 5 were then tested in a test apparatus simulating useage of the material when lubricating the bearing of a General Electric Company 39-Frame motor end shield. A schematic diagram of the testing apparatus utilized is shown in FIG. 3. Referring to FIG. 3, the test equipment included a 5½ inch steel wheel 40 having a one inch wide peripheral rim. The wheel was rotatably mounted on a frame 41. A pair of oil scrapers 42 were mounted on the frame to remove oil picked up by the peripheral wheel 40. A felt wiper 45 was mounted on the frame 41 and positioned against the wheel to remove any remaining oil left by the scrapers. The test sample of lubricating oil impregnated wicking material was placed in a test unit indicated generally at 44. The test unit included a container or tube 46 having a volume which approximated that of the lubricant reservoir in the 39-Frame motor end shield of the type shown in FIG. 1. A felt feeder wick 48 extended through the end cap of the container 46 to the surface of the wheel rim 40. The opposite end of the container 46 was capped with an end cap perforated to permit air pressure within the tube 46 to be equalized with ambient air pressure. Aluminum heater coils 49 were wrapped about the exterior of the container 46 and a thermocouple (not shown) was attached to control the temperature of the sample. With the sample temperature maintained at 75° C., the wheel 40 was rotated at a speed which, in connection with the area of the feeder wick terminal surface, simulated a one-half inch shaft rotating at 1,750 rpm in a 39-Frame motor end shield bearing. Oil loss versus time was determined by periodically weighing the sample container 46. The results of the tests with the composition of Examples 2 and 5 are shown in FIG. 5.

EXAMPLE 6

Composition:
3½% by weight 108 Type E microfibers of glass 10% by weight particulate ester type polyurethane
86½% by weight type 280 bearing lubricating oil Preparation:
The microfibers of glass (Johns-Manville 108 Type E) were chopped as described in Example 4 and thoroughly mixed with the type 280 bearing lubricating oil. Resilient, ester type polyurethane foam having 60 ppi (pores per linear inch), obtained from Scott Paper Co., Eddystone, Pa. was reduced or otherwise comminuted into foam particles until substantially all the foam particles passed through a U.S. Standard Sieve Series size 5-mesh screen, and a majority passed through a size 20-mesh screen. The resulting particulated polyurethane was then thoroughly admixed with the mixture of microfibers of glass and oil.

EXAMPLE 7

Composition:
2½% by weight 108 Type E microfibers of glass
12½% by weight particulate ester type polyurethane
85% by weight type 280 bearing lubricating oil Preparation:
The microfibers of glass were chopped and thoroughly mixed with the lubricating oil, as described in Example 6. Resilient 60 ppi ester type polyurethane foam, of the type referred to in Example 6, was reduced or otherwise comminuted into particles until about 60 to 70% of the particles passed through a size 20-mesh screen. The resulting polyurethane foam particles were then thoroughly admixed with the mixture of microfibers of glass and oil.

EXAMPLE 8

Composition:
1½% by weight 108 Type E microfibers of glass
13½% by weight particulate ester type polyurethane
85% by weight type 280 bearing lubricating oil Preparation:
The microfibers of glass were chopped and thoroughly mixed with the bearing lubricating oil as described in Example 6. Resilient 75 ppi ester type polyurethane foam, from Scott Paper Co., was reduced or otherwise comminuted into foam particles until a majority of the foam particles passed through a size 8-mesh screen. These polyurethane foam particles were then thoroughly admixed with the mixture of microfibers of glass and oil.

EXAMPLE 9

Composition:
3% by weight microfibers of quartz
12% by weight particulate ester type polyurethane
85% by weight type 280 bearing lubricating oil Preparation:
The microfibers of quartz, of the type described in Example 2, were thoroughly mixed with the bearing lubricating oil. Resilient, 60 ppi, ester type polyurethane foam was reduced or otherwise comminuted into foam particles until a majority of the foam particles passed through a size 5-mesh screen. The resultant polyurethane foam particles were then thoroughly admixed with the mixture of microfibers of quartz and oil.

Figure 6:
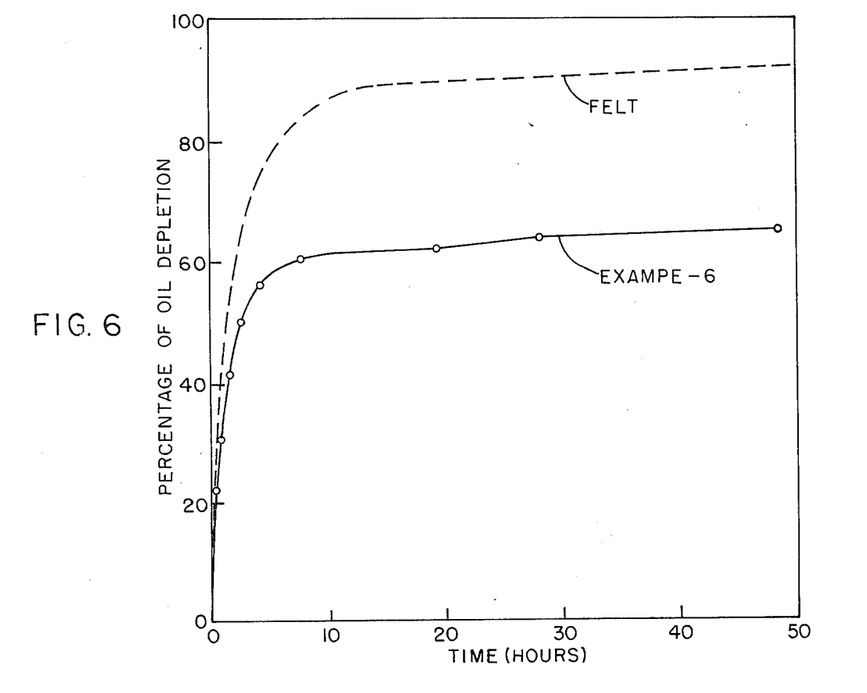
FIG. 6 is a graphic representation of the oil release characteristics of a lubricant composition prepared according to Example 6.
Figure 7:
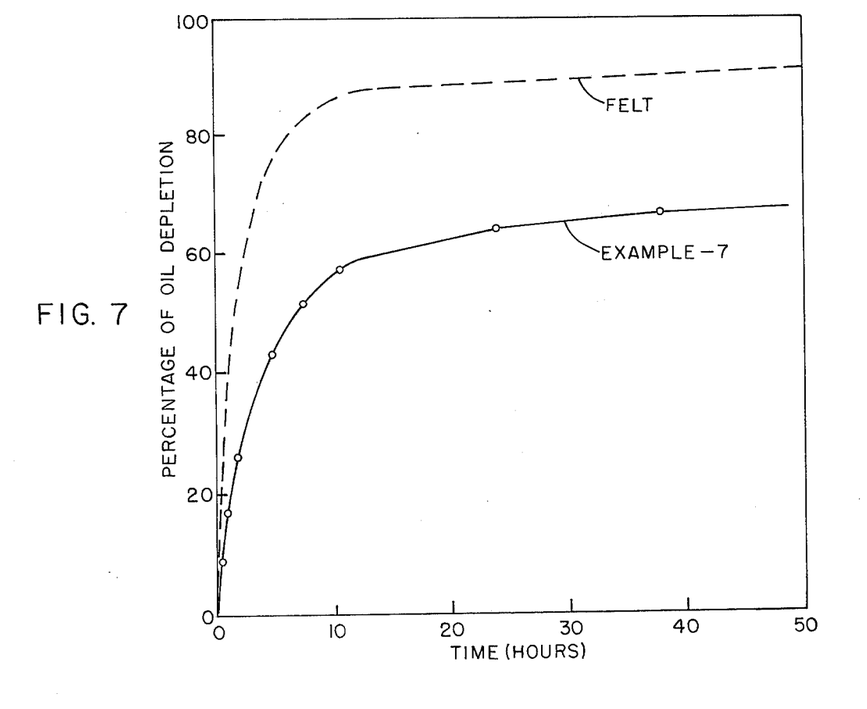
FIG. 7 is a graphic representation of the oil release characteristics of a lubricant composition prepared according to Example 7.
Figure 8:
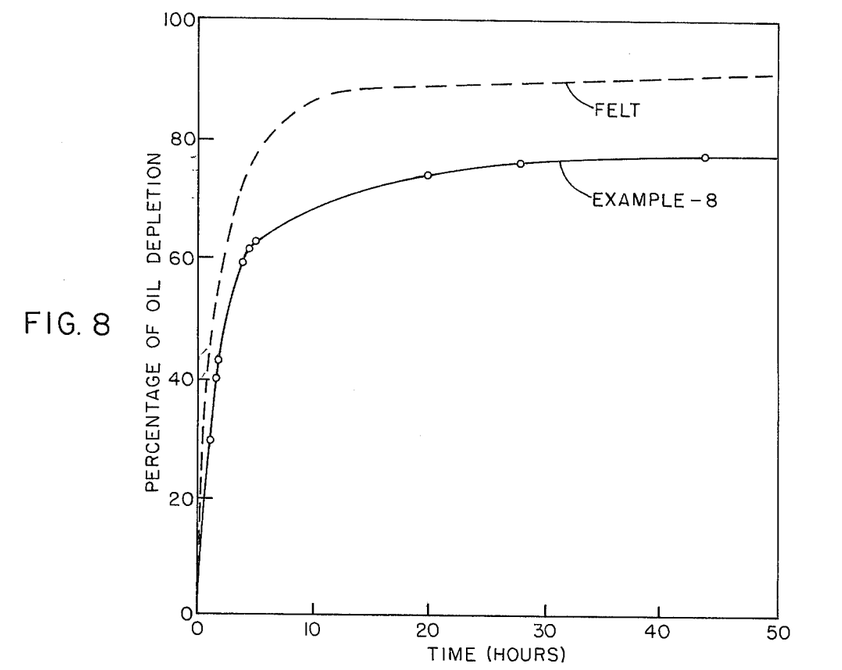
FIG. 8 is a graphic representation of the oil release characteristics of a lubricant composition prepared according to Example 8.

The lubricant impregnated wicking material prepared as described in Examples 6, 7 and 8 was then packed into a General Electric Company 39-Frame motor end shield, of the type shown in FIG. 1, but modified to prohibit oil from recirculating to the bearing cavity. The end shield to be tested was mounted in a testing apparatus of the type shown in FIG. 2, and a bearing load of 45 pounds was applied to the shaft outboard of the bearing structure. The bearing temperature was maintained at 70° C. An on/off cycle of 4.75 minutes on and to 0.25 minutes off was applied. The test results for Examples 6, 7 and 8 were plotted and are shown in solid lines in FIGS. 6, 7 and 8. The results shown in FIGS. 6, 7 and 8 were compared to the oil release rate of the wool felt, as measured in a similar test utilizing a wool felt packing, as shown in dotted lines in FIGS. 6, 7 and 8. With reference to these figures, it may be seen that during the first few hours the oil impregnated wicking material of the invention released oil at an excellent rate, that is at a rate sufficiently high to ensure proper bearing lubrication, while not so high as either to cause overflow of oil within the motor, or to overstress the oil reabsorption rate capacity of the wicking material. The circled points along the curves indicate actual test measurements upon which the curves are based.

Figure 9:
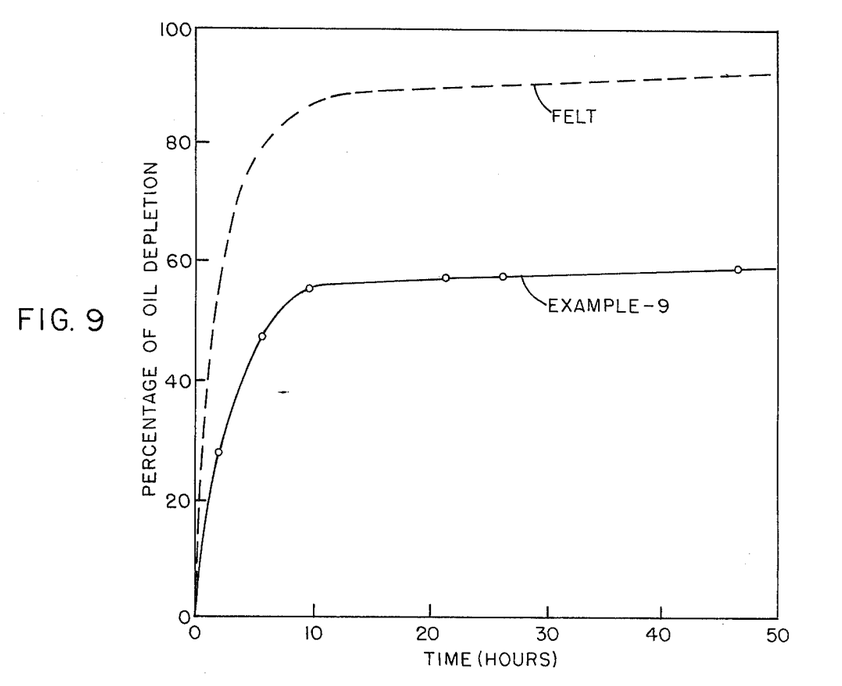
FIG. 9 is a graphic representation of the oil release characteristics of a lubricant composition prepared according to Example 9.

The lubricating oil impregnated wicking medium prepared according to Example 9 was then tested in a test apparatus of the type shown in FIG. 3 and described above. Oil loss versus time was determined by periodically weighing the sample containing tube, and the results were plotted and are shown in the solid line in FIG. 9. It should be noted that the test on the wool felt, shown in FIGS. 6, 7, 8 and 9 was also obtained in an apparatus of the type shown in FIG. 3, utilizing wool felt as the lubricant containing packaging material.

Either microfibers of glass or microfibers of quartz mixed with a liquid lubricant may be admixed with particulate polyurethane polymeric materials to form a lubricant composition suitable for packing by hand or by commercially available extruding equipment into bearing cavities of apparatus, such as dynamoelectric machines for instance.

As pointed out in copending application Ser. No. 407,635, filed Oct. 18, 1975, the foam should be resilient and also heat resistant to at least 105°C under continued use. Foam densities of about 2 pounds per cubic foot have been found to produce desirable results, where the foam meets the other characteristics required, particularly those of being multi-digited and resilient.

For the composite wicking material, microfibers of glass are preferred over microfibers of quartz for reasons of economy, although both perform equally well. In general, it has been observed that the preferred range of average lengths of the microfibers of glass or quartz is between about 5 and about 15 mils.

By blending microfibers of glass or quartz with particulate polyurethane materials, it is possible to prepare lubricant compositions possessing the functional characteristics specifically desired for a particular application. In general, it has been observed that the larger the synthetic fiber content with respect to the polymer content, the greater will be the oil retention property of the lubricant composition. Conversely, the larger the foam content, the greater the oil release rate.

While certain illustrative forms and compositions embodying the present invention have been described above in considerable detail, it should be understood that there is no intention to limit the invention to the specific forms and compositions disclosed. On the contrary, the intention is to cover all modifications, alternative forms and compositions, equivalents and uses falling within the spirit and scope of the invention as expressed in the appended claims.

What I claim as new and desire to secure by Letters Patent of the United States is:

1. A lubricant composition for lubricating a component which may be communicated therewith comprising a mixture of a major amount by weight of a liquid lubricant, a minor amount by weight of a particulate mass of synthetic fibers, and a minor amount by weight of a particulate mass of discrete, non-fibrous, multi-digited, resilient-type foam particles generally constituting means for both retaining and releasing the liquid lubricant adapted to effect the lubrication of the component.

2. A lubricant composition as set forth in claim 1, wherein the synthetic fibers have an average diameter between about 0.75 and about 5.5 microns.

3. A lubricant composition as set forth in claim 2, wherein the synthetic fibers have an average length of between about 0.005 and about 0.015 inches.

4. A lubricant composition as set forth in claim 1, wherein the synthetic fibers are selected from a group consisting of microfibers of glass and microfibers of quartz.

5. A lubricant composition as set forth in claim 1, wherein the synthetic fibers are microfibers of glass.

6. A lubricant composition as set forth in claim 1, wherein the synthetic fibers are microfibers of quartz.

7. A lubricant composition as set forth in claim 1, wherein the weight ratio of the foam particles to the synthetic fibers is between about 3 to 1 to about 5 to 1.

8. A lubricant composition as set forth in claim 1, wherein the mixture contains between about 10% to about 20% by weight of the synthetic fibers and the foam particles and between about 80% to about 90% by weight of the liquid lubricant.

9. A lubricant composition as set forth in claim 4, wherein the mixture contains between approximately 13% to approximately 17% by weight of the synthetic fibers and the foam particles and between approximately 83% to approximately 87% by weight of the liquid lubricant.

10. A lubricant composition as set forth in claim 1, wherein the foam material of the foam particles is selected from a group consisting of ester type polyurethane polymers and ether type polyurethane polymers.

11. A lubricant composition as set forth in claim 1, wherein the foam particles have a particulate size in a range of between about 5-mesh and about 200-mesh.

12. A lubricant composition as set forth in claim 1, wherein a major portion of the foam particles have a particulate size smaller than about 20-mesh and larger than about 80-mesh.

13. A lubricant composition as set forth in claim 12, wherein the major portion comprises approximately 65% to about 85% of the foam particles.

14. A lubricant composition as set forth in claim 1, wherein the foam particles have a particulate size smaller than approximately 8-mesh and larger than approximately 80-mesh.

15. A lubricant composition as set forth in claim 1, wherein ruptured cell ribs and cell walls of the cellular structure of the foam particles define the multi-digited characteristic thereof.

16. A lubricant composition as set forth in claim 15, wherein the liquid lubricant is releasably retained generally between at least some of the ruptured cell ribs and cell walls of the foam particles.

17. A method of forming a lubricant composition adapted for releasing a liquid lubricant and lubricating a component which may be communicated therewith comprising the steps of:
   a. mixing a minor amount by weight of a particulate mass of synthetic fibers and a major amount by weight of the liquid lubricant; and
   b. admixing thereto a minor amount by weight of a particulate mass of discrete, non-fibrous, multi-digited, resilient-type foam particles and generally saturating the foam particles with the liquid lubricant thereby to form the lubricant composition.

18. The method as set forth in claim 17, wherein the mixing step further comprises proportioning the weight ratio of the liquid lubricant to the synthetic fibers in a range of between approximately 24.7 to 1 to approximately 56.7 to 1.

19. The method as set forth in claim 18, wherein the admixing and saturating step further comprises proportioning the weight ratio of the liquid lubricant and synthetic fiber mixture to the foam particles in a range of between about 6.4 to 1 to about 9 to 1.

20. The method as set forth in claim 17, comprising the step of reducing a foam polymer material into the foam particles having a particulate size of between approximately 5-mesh and approximately 200-mesh prior to the admixing and saturating step.

21. The method as set forth in claim 20, wherein the reducing step further comprises fracturing at least most of the cell ribs and cell walls of the cellular structure of the foam polymer material for effecting the multi-digited characteristic of the foam particles.

22. The method as set forth in claim 21, wherein the admixing and saturating step further comprises retaining the liquid lubricant generally between at least some of the fractured cell ribs and cell walls of the foam particles for subsequent release.

23. The method as set forth in claim 17, wherein a foam polymer material from which the foam particles are formed is selected from a group consisting of ether type polyurethane polymers and ester type polyurethane polymers.

24. The method as set forth in claim 17, further comprising the step of comminuting a foam polymer material into the foam particles wherein a major portion thereof have a particulate size smaller than about 20-mesh and larger than about 80-mesh prior to the admixing and saturating step.

25. The method as set forth in claim 17, wherein the synthetic fibers have an average diameter of between approximately 0.75 and approximately 5.5 microns.

26. The method as set forth in claim 17, wherein the synthetic fibers are selected from a group consisting of microfibers of glass and microfibers of quartz.

27. The method as set forth in claim 17, wherein the synthetic fibers are microfibers of glass.

28. The method as set forth in claim 17, wherein the synthetic fibers are microfibers of quartz.

29. A lubricant composition as set forth in claim 1, wherein the foam particles are generally inert to and insoluble in the liquid lubricant.

30. A lubricant composition as set forth in claim 1, wherein the synthetic fibers are generally inert to and insoluble in the liquid lubricant.

31. A lubricant composition as set forth in claim 1, wherein the foam particles are polyurethane foam.

32. A lubricant composition as set forth in claim 31, wherein the polyurethane foam is an ether type.

33. A lubricant composition as set forth in claim 31, wherein the polyurethane foam is an ester type.

34. A lubricant composition as set forth in claim 1, wherein a major portion of the foam particles are within a size range between approximately 20-mesh and approximately 80-mesh with the remaining foam particles of the mass having sizes generally between about 5-mesh and about 200-mesh exclusively of the major portion range size.

* * * * *

UNITED STATES PATENT OFFICE
CERTIFICATE OF CORRECTION

PATENT NO. : 3,907,690
DATED : September 23, 1975
INVENTOR(S) : James A. Whitt

It is certified that error appears in the above-identified patent and that said Letters Patent are hereby corrected as shown below:

```
Col.  1, line 53, delete "Permawick" and insert --"Permawick"--.
Col.  2, line 11, after "Slayter" delete ",";
         line 12, delete ",".
Col.  3, line  8, delete "this" and insert --the invention--;
         line 23, delete "on" and insert --one--;
         line 29, after "a" insert --particulate--;
         line 29, after "mixed" insert --,--;
         line 51, delete "lubricating" and insert --lubricant--.
Col.  6, line  6, delete "108 type E" and insert --"108 type E"--;
         line 10, delete "110 type 475" and insert --"110 type 475"--;
         line 27, delete "1975" and insert --1973--;
         line 53, delete "resilient" and insert --"resilient"--;
         line 56, delete "rigid" and insert --"rigid"--;
         line 60, delete "characteristics" and insert --characteristic--.
Col.  7, line  3, delete "280 oil" and insert --"280 oil"--.
Col.  8, line 52, delete "on" and insert --"on"--;
         line 52, delete "off" and insert --"off"--.
Col.  9, line 52, "10%" should begin line 53.
Col. 10, line  6, "85%" should begin line 6;
         line 23, "85%" should begin line 24;
         line 60, delete "on" and insert --"on"--;
         line 60, delete "off" and insert --"off"--.
Col. 11, line 27, delete "1975" and insert --1973--;
         line 29, delete "2" and insert --two--.
```

Signed and Sealed this third Day of February 1976

[SEAL]

Attest:

RUTH C. MASON
*Attesting Officer*

C. MARSHALL DANN
*Commissioner of Patents and Trademarks*